United States Patent [19]
Cooper et al.

[11] 3,721,477
[45] March 20, 1973

[54] ENDLESS TRACK

[75] Inventors: Jerry W. Cooper; Leland E. Williams, both of Waynesville; John S. Haley, Lake Junaluska; Rufus N. Ensley, Clyde, all of N.C.

[73] Assignee: Dayco Corporation, Dayton, Ohio

[22] Filed: Aug. 20, 1970

[21] Appl. No.: 65,568

[52] U.S. Cl. ................................................. 305/38
[51] Int. Cl. ............................................. B62d 55/24
[58] Field of Search ................... 305/35 EB, 38, 37; 152/225–228; 180/5

[56] References Cited

UNITED STATES PATENTS

| | | | |
|---|---|---|---|
| 1,129,666 | 2/1915 | Gray | 305/35 EB |
| 3,612,626 | 10/1971 | Fuchs | 305/38 |
| 3,558,198 | 1/1971 | Tomita | 305/35 EB |
| 3,623,780 | 11/1971 | Kell | 305/38 |
| 3,205,023 | 9/1965 | Nodwell | 305/28 |
| 3,550,968 | 12/1970 | Rymes | 305/35 EB |
| 3,469,553 | 9/1969 | Gagne | 180/5 R |
| 3,472,563 | 10/1969 | Irgens | 305/35 EB X |
| 3,582,155 | 6/1971 | Marier | 305/38 |
| 1,343,293 | 6/1920 | Waite | 152/225 |
| 2,924,490 | 2/1960 | Haushalter | 305/38 |
| 3,027,200 | 3/1962 | Patterson | 305/54 |
| 3,485,312 | 12/1969 | Swenson | 180/5 |
| 3,474,751 | 10/1969 | Hebert | 180/5 X |

OTHER PUBLICATIONS

Poly Trac – Gates Rubber Co., Denver, Colorado, 1970.
Moto-Ski, Advertising Brochure, Cover & Page 6, Industries Bouchard, Inc., La Pocatiere, P. Q., Canada

*Primary Examiner*—Richard J. Johnson
*Attorney*—Reuben Wolk

[57] ABSTRACT

An endless track is provided that is comprised of band-like body made of an elastomeric material and a plurality of cleats securely bonded thereto by partial embedment therein, and the body has a suitable drive mean enabling the track to be driven by an associated drive. Each cleat has a substantially U-shaped configuration comprised of a bight and a pair of outwardly extending legs having exposed outer ends and the cleats provide both improved lateral stability and traction for the track.

18 Claims, 10 Drawing Figures

INVENTORS
JERRY W. COOPER
LELAND E. WILLIAMS
JOHN S. HALEY
RUFUS N. ENSLEY

BY Reuben Wolk
ATTORNEY

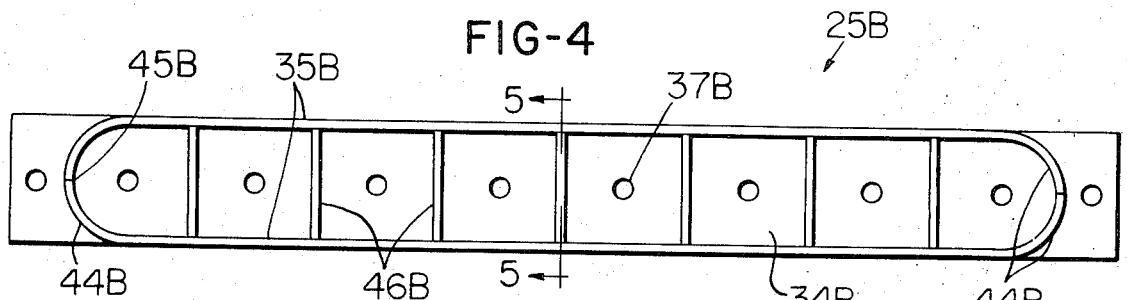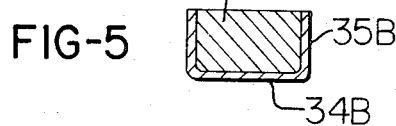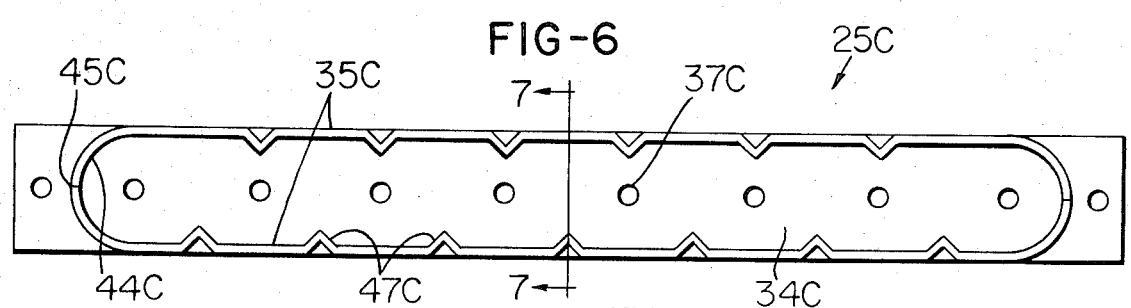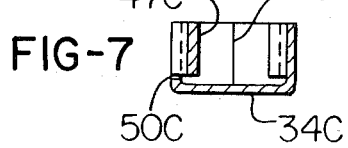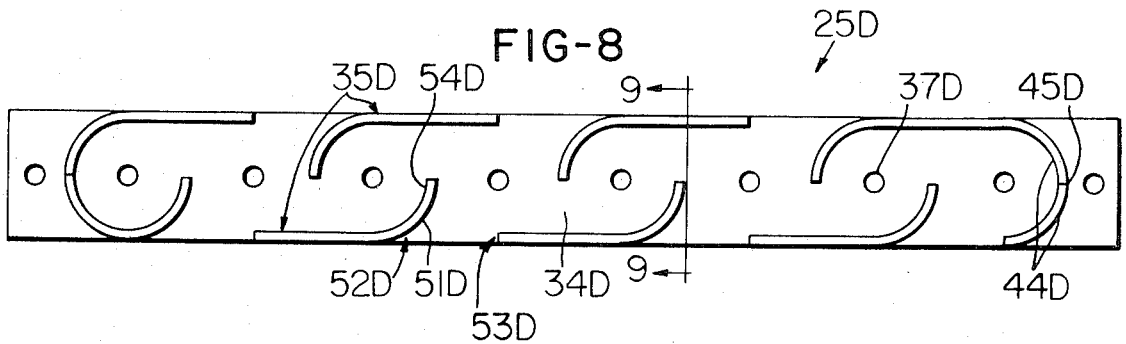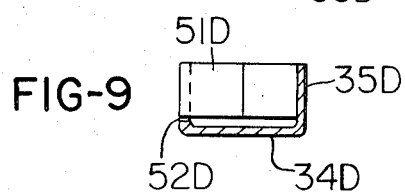

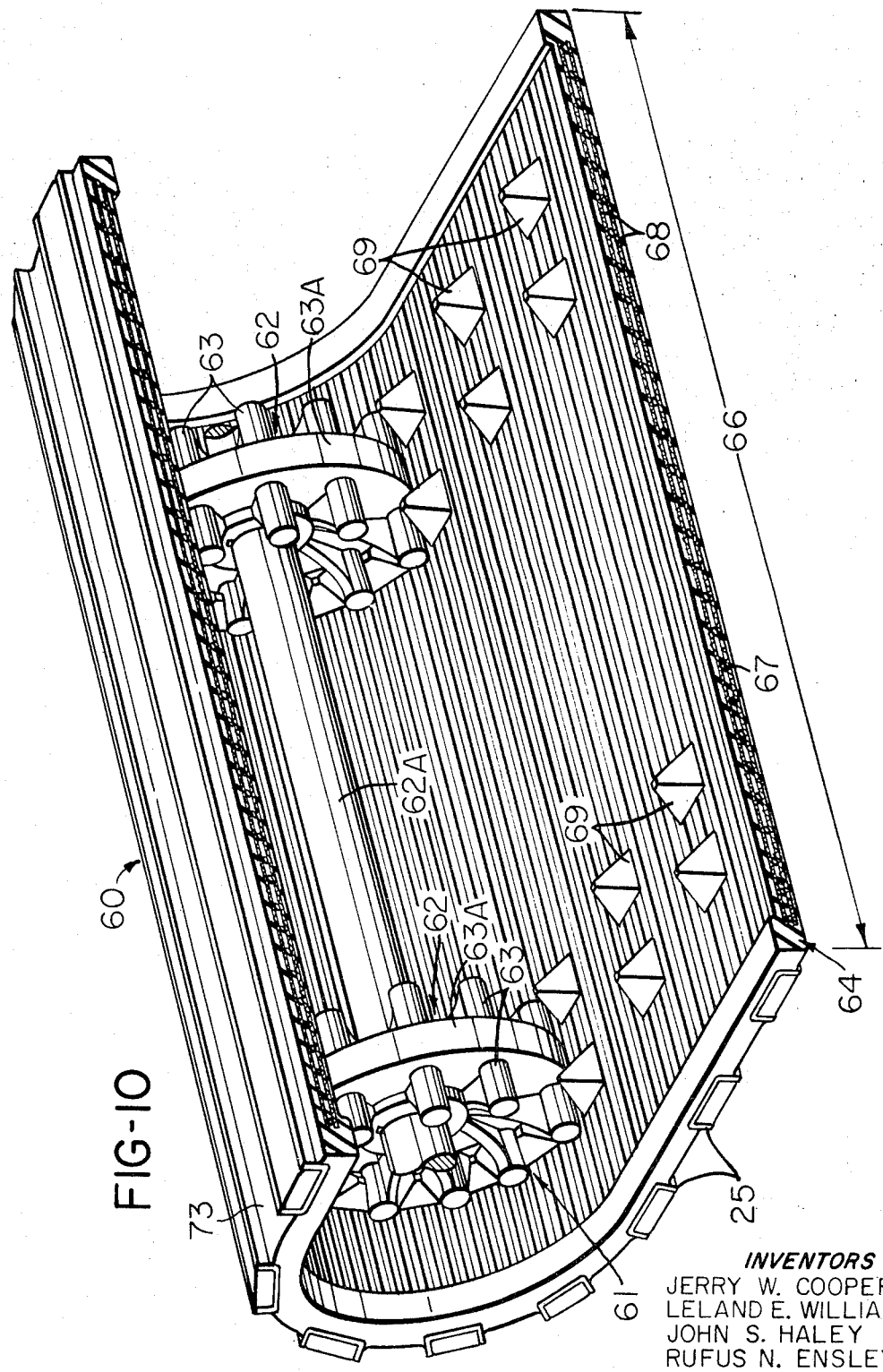

ENDLESS TRACK

BACKGROUND OF THE INVENTION

Endless traction belts or tracks used on snowmobiles, tractors, and the like, are often provided with spaced cleats which are arranged in parallel relation along the endless path of the track and are fixed to a main body thereof by riveting or other means which require separate mechanical attaching members. These previous tracks are generally deficient because their cleats wear comparatively rapidly and are easily severed or torn from their associated main body. In addition, these tracks are very noisy during operation.

SUMMARY

This invention provides an improved endless track of simple and economical construction which has a band-like main body made of an elastomeric material, is quiet running, has improved cleats bonded thereto by partial embedment, and has an improved operating life; and, the body has drive means enabling the track to be driven by an associated drive. Each cleat of the endless track has a substantially U-shaped configuration comprised of a bight and a pair of outwardly extending legs having exposed outer ends and the cleats provide both improved lateral stability and traction for the track.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 4 is a plan view of another embodiment of a cleat which may be partially embedded in an associated body portion of an endless track in a similar manner as the cleats of FIG. 1, for example;

FIG. 5 is a cross-sectional view taken on the line 5—5 of FIG. 4;

FIG. 6 is a plan view illustrating another embodiment of a cleat which is similar to the cleat of FIG. 4;

FIG. 7 is a cross-sectional view taken on the line 7—7 of FIG. 6;

FIG. 8 is a plan view illustrating still another embodiment of a cleat which is similar to the cleat of FIG. 4;

FIG. 9 is a cross-sectional view taken on the line 9—9 of FIG. 8; and

FIG. 10 is a perspective view with parts in cross-section and parts broken away illustrating another exemplary embodiment of an endless track of this invention.

DESCRIPTION OF ILLUSTRATED EMBODIMENTS

Figure 1:
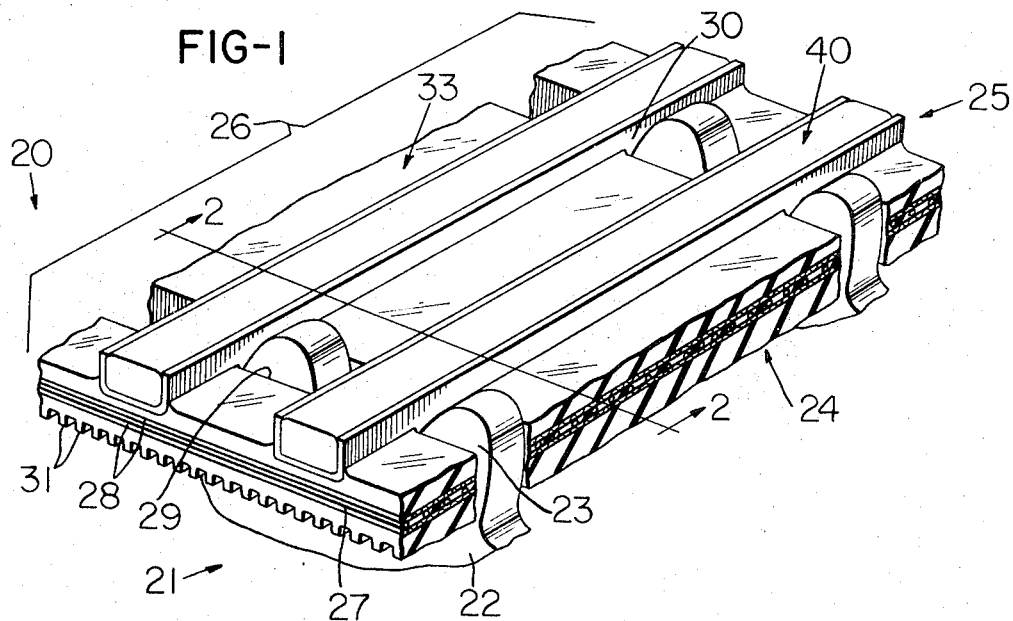
FIG. 1 is a perspective view with parts in cross-section and parts broken away particularly illustrating one exemplary embodiment of an improved endless track of this invention which is driven by a sprocket wheel assembly having a plurality of two axially spaced sprockets.

Reference is now made to FIG. 1 of the drawings, which illustrates one exemplary embodiment of an endless traction belt or track of this invention which is designated generally by the reference numeral 20 and such track is particularly adapted to be moved in an endless path in a known manner. The track 20 may be used on a motor driven vehicle such as a tractor, snowmobile, or the like and is adapted to be driven by a drive such as a driving sprocket assembly 21 which is comprised of a plurality of two sprocket wheels 22 each having a plurality of circumferentially equally spaced apart driving teeth 23 of standard construction. The track 20 has a main body portion or body 24 which may be made of any suitable elastomeric material, such as natural or synthetic rubber, any suitable polymer, such as polyurethane, or the like, and the track 20 has a plurality of cleats 25 extending across practically the full width 26 thereof.

Figure 2:
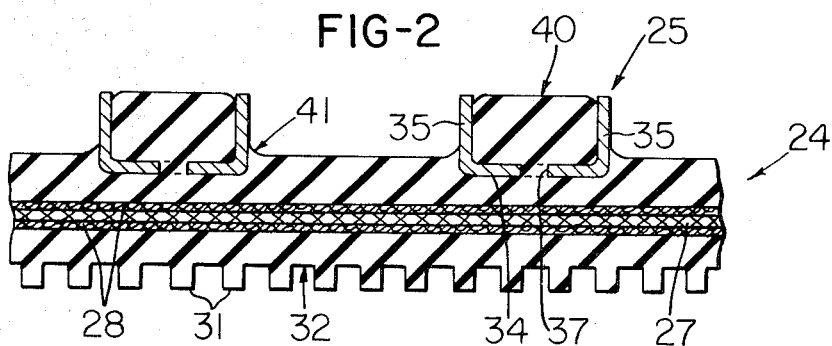
FIG. 2 is an enlarged fragmentary cross-sectional view taken essentially on the line 2—2 of FIG. 1.

The main body 24 has a longitudinal cord 27 which extends in an endless path and provides added reinforcement for such body, see FIG. 2. The cord 27 may be made of any suitable material and in those applications where the main body 24 is made of polyurethane, for example, the cord may be made of a suitably treated polyester. The main body 24 also has a pair of fabric layers 28 arranged substantially in parallel relation on opposite sides of the cord 27 and such layers also serve to reinforce the main body. The fabric layers 28 may also be suitably treated to assure adhesion and bonding of such layers to the material used in making the main body 24.

The track 20 has suitable drive means in the form of a plurality of openings 29 provided in equally spaced relation along the endless path of the endless track 20 and in this example of the invention, which comprises track 20 driven by a sprocket wheel assembly 21 which has a plurality of two sprocket wheels 22, the openings 29 are provided in a pair of sets arranged along opposite sides of the track 20. Each opening 29 is provided in the track 20 using any suitable technique and preferably so that the opening exposes a portion 30 of an associated cleat 25 to enable an associated tooth 23 of the sprocket wheel 22 to engage and drive the track by direct engagement against the cleat. In essence, this minimizes any tendency for wear on the main body 24 of the track 20 in the area adjoining each opening 29; also, each opening 29 is provided so that each tooth 23 moves into and out of its associated opening 29 in an unobstructed manner to assure efficient driving of the endless track 20.

The track 20 also has a plurality of equally spaced parallel projections or ribs 31 which extend outwardly from an inside sprocket engaging surface 32 of such track and the ribs provide improved lateral stability for the track 20. Each rib 31 has a substantially rectangular cross-sectional configuration; however, it will be appreciated that the ribs 31 may have any desired cross-sectional configuration and in those applications where it is desired that the track 20 have greater flexibility the ribs 31 are preferably eliminated.

The endless track 20 has a ground engaging surface 33 defined as the outside surface of the main body 24 and the cleats 25 are bonded in position and essentially formed as an integral part of the main body 24 by being partially embedded therein whereby the outer portions of such cleats comprise part of such ground engaging surface and assure the provision of optimum traction. The cleats 25 are substantially U-shaped cleats, as viewed either in cross section or from an end thereof, and each cleat has a bight 34 and a pair of outwardly extending legs 35 each extending from opposite ends of the bight 34. The outwardly extending legs 35 have exposed terminal end portions which are capable of firmly gripping the surface which they engage to assure the provision of optimum traction in the manner previously mentioned.

Each cleat 25 has a plurality of spaced openings 37 provided along the central portion of its bight 34 and such openings enable elastomeric material to extend therethrough to help hold each cleat 25 firmly in position even under adverse operating conditions. In addition, it will be seen that each cleat 25 has the volume defined by its bight 34 and outwardly extending legs 35 substantially filled with the elastomeric material comprising the main body 24 as indicated at 40 and also has elastomeric material extending upwardly along the outside surfaces of the outwardly extending legs 35 as indicated at 41.

From the above discussion, it will be apparent that the endless track 20, in essence, has high strength cleats 25 positively fixed in its main body 24 by partial embedment or encapsulation whereby positive attachment is provided. In addition, such cleats are cushioned by the elastomeric material and provide quieter operation, are safer because sharp edges thereof are partially protected by elastomeric material, and provide optimum traction. Further, endless tracks using such cleats are capable of operation over extended periods even under adverse operating conditions, such as running on hard surfaces such as dirt, ice, or the like.

Figure 3:
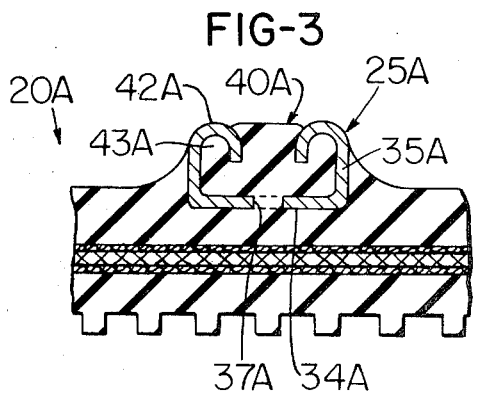
FIG. 3 is a fragmentary cross-sectional view similar to FIG. 1 and illustrating another exemplary embodiment of a cleat partially embedded in position within a main body portion of a track.

Another exemplary embodiment of an endless track of this invention is illustrated in fragmentary cross-sectional view in FIG. 3 of the drawings. The track illustrated in FIG. 3 is very similar to the track 20; therefore, such track will be designated generally by the reference numeral 20A and parts of the track 20A which are very similar to corresponding parts of the track 20 will be designated by the same reference numeral as the track 20, also followed by the letter designation A and not described again. Only those component parts which are different from corresponding parts in the track 20 will be designated by a new numeral also followed by the letter designation A and described in detail.

The main difference between the track 20A and the track 20 is that the track 20A utilizes another embodiment of a cleat 25A as an integral part thereof. Each cleat 25A comprising the endless track 20A also has a bight 34A and outwardly extending legs 35A; however, the terminal end portions of the outwardly extending legs 35A are formed (by rolling, for example) inwardly to define inwardly hooking or roughly L-shaped extensions 42A extending from the terminal ends of the outwardly extending legs 35A. The extensions 42A extend within the elastomeric material 40A contained in the volume defined by the bight 34A and the legs 35A. The cleats 25A have all of the advantages of the cleats 25, plus have increased strength because of the increase in structural strength afforded by the extensions 42A and the fact that elastomeric material also helps support the legs 35A inasmuch as it occupies the volume indicated at 43A beneath each extension 42A.

Reference is now made to FIGS. 4, 6, and 8 of the drawings which illustrate other exemplary embodiments of cleats which are similar to the cleats 25 and 25A and the cleats of FIGS. 4, 6, and 8 may be partially encapsulated or partially embedded in an elastomeric main body of an associated endless track in a similar manner as the cleats 25 and 25A illustrated in FIGS. 2 and 3, respectively, to define endless tracks which would be identical to the track 20 except for such cleats. For ease of presentation and understanding, the cleats of FIGS. 4, 6, and 8 will be designated by the reference numerals 25B, 25C, and 25D and component portions thereof which are similar to corresponding component portions of the cleats 25 and 25A will be designated by the same reference numeral as previously, followed by the letter designation B, C, or D, depending upon whether such component portions comprise the cleat of FIG. 4, FIG. 6, of FIG. 8 respectively.

The cleat 25B also has a bight 34B and outwardly extending legs 35B extending from opposite sides of such bight. The outwardly extending legs 35B have opposite end portions 44B which are severed from the bight 34B and formed inwardly in an arcuate path so that the terminal ends of portions 44B are arranged in abutting relation as indicated at 45B to define a substantially semicylindrical configuration whereby the outwardly extending legs 35B have added strength and rigidity and are prevented from collapsing inwardly.

The cleat 25B also has a plurality of spacer members 46B (also see FIG. 5) fixed in position between its outwardly extending legs 35B. The members 46B may be fixed to one or both legs 35B as well as to the bight using any suitable technique, such as welding, for example. The members 46B serve to further strengthen the outwardly extending legs 35B to prevent either inward or outward collapse thereof during operation of the cleat 25B in an endless track when used even under adverse operating conditions.

The cleat 25C, see FIGS. 6 and 7, has a bight 34C and a pair of outwardly extending legs 35C and the opposite end portions 44C of the legs 35C have been severed from such bight and formed inwardly in an arcuate path with the ends thereof arranged in adjoining relation as shown at 45C. Each outwardly extending leg 45C has a plurality of substantially V-shaped projections 47C defined therein and each V-shaped projection is formed by cutting a slit 50C of predetermined length at the junction of each outwardly extending leg 45C with the bight 34C. Each projection 47C is made by inward forming of a rectangular strip which has one edge thereof defined by slit 50C. The projections 47C serve the same basic function as the members 46B of cleat 25B and, thus, increase the strength of the outwardly extending legs 35C and assure that there is minimum tendency for collapsing or flattening of such legs.

The cleat 25D is illustrated in FIGS. 8 and 9 and is similar to the cleat 25C. The cleat 25D has a bight 34D and a pair of outwardly extending legs each designated generally by the reference numeral 35D. Each leg 35D is defined in a plurality of cooperating sections 51D. The cleat 25D also has the opposed end portions 44D of its outwardly extending legs 35D severed from the bight 34D and formed inwardly in an arcuate path until the terminal ends of portions 44D are arranged in abutting relation as indicated at 45D.

The cooperating sections 51D comprising the outwardly extending legs 35D are defined by cutting an elongated slit between one end portion of each section 51D at its junction with the bight 34D as indicated at 52D and another slit transverse one end of the slit 52D as indicated at 53D and then forming the free end of the section 51D thus defined inwardly to define an arcuate roughly hook-shaped or hooking end 54D which extends toward the center of the bight 34D. The hooking extensions 54D are for the same purpose as the members 46B of cleat 25B and the projections 47C of cleat 25C and, thus, serve to increase the strength and stability of the outwardly extending legs 35D.

Each cleat 25A, 25B, 25C, and 25D may be used interchangeably with the cleat 25 in the endless track 20 and it will be appreciated that in each instance, each cleat 25A, 25B, 25C, and 25D will have elastomeric material extending through its respective openings 37A, 37B, 37C, and 37D to help anchor the associated cleat in position in a high strength manner. It will also be appreciated that a substantial amount of elastomeric material will be provided between the bight and the outwardly extending legs of each cleat and such elastomeric material cooperates with inwardly rolled extensions in cleat 25A, the members or plates 46B in cleat 25B, the V-shaped projections 47C in the cleat 25C, and with the arcuate or hooking ends 54D in the cleat 25D to further assure the associated cleat has optimum structural strength and rigidity.

Another exemplary embodiment of an endless traction belt or track which is particularly adapted to be moved in an endless path is illustrated in FIG. 10 of the drawings and designated generally by the reference numeral 60. The track 60 may be used on a vehicle such as a snowmobile, or the like, and is adapted to be driven by a drive such as a driving assembly 61 comprised of a plurality of two drive wheels 62 which are suitably fixed as by keying to a common shaft 62A and such shaft may be driven in a known manner by a suitable drive motor. Each drive wheel 62 has a plurality of driving members 63 provided adjacent its periphery which extend from opposite sides of a central disc 63A and the members 63 drive the endless track 60 in a manner which will be described in more detail subsequently.

The track 60 has a main body 64 which may be made of any suitable elastomeric material in a similar manner as described in connection with the track 20 and the track 60 has a plurality of cleats extending across practically the full width 66 thereof, and because such cleats may be identical to the cleats 25 comprising the track 20 the cleats of track 60 will also be designated by the reference numeral 25.

The main body 64 has a longitudinal reinforcing cord 67 embedded in the central portion thereof and the cord 67 extends in an endless path. The main body 64 also has a pair of fabric layers 68 embedded therein and arranged on opposite sides of the longitudinal cord 67 and the layers 68 also serve to reinforce the main body 64.

The track 60 has drive means in the form of a plurality of drive lugs 69 which extend from the inside surface of the main body 64 and may be made of the same elastomeric material as the main body and as an integral part thereof. Each lug 69 of this example has a substantially frustopyramidal configuration and the lugs 69 are arranged in equally spaced relation along the endless path in a pair of parallel rows adjacent each side edge portion of the track 60. The driving members 63 of each wheel 62 engage associated lugs 69 and drive the endless track 60 in a known manner.

The lugs 69 have been described as being made as an integral part of the main body 64 and hence are also made of elastomeric material; however, it will be appreciated that such lugs may be made of any suitable material and may be fixed to main body 64 in any known manner.

The endless track 60 also has a ground engaging surface 73 defined as the outside surface of the main body 64 and the cleats 25 are bonded in position and essentially formed as an integral part of the main body 64 by being partially embedded therein in a similar manner as the cleats 25 in the main body 24 of the track 20.

In a similar manner as described for the endless track 20, the cleats 25A, 25B, 25C, and 25D may be used interchangeably with the cleats 25 in the endless track 60 whereby a track 60 using a particular type of these cleats will provide improved performance essentially as described previously in connection with the description of each cleat.

In this disclosure of the invention, a pair of fabric layers have been embedded in the main body of each endless track to provide added reinforcement for the associated body. However, it will be appreciated that in some applications of this invention the fabric layers may be eliminated or other reinforcing components may be used instead of the fabric layers and longitudinal cord.

Each of the cleats 25 and 25A–D may be formed in any suitable manner using any suitable material including either a metallic or a non-metallic material. Further, such cleats may be made by extrusion processes, roll forming, or any suitable process which lends itself to manufacture of cleats in high quantity at minimum cost. In addition, it will be appreciated that all of the cleats of this invention, except cleat 25B, may be made entirely from a single flat strip or blank of metal which may be suitably formed using any known technique.

It will also be appreciated that the semicylindrical ends defined by associated end portions 44B in cleat 25B, end portions 44C in cleat 25C, and end portions 44D in cleat 25D prevent an associated endless track from slipping transverse its endless path, i.e., prevent side slippage of such track. In addition, the spacer members 46B, V-shaped projections 47C and hooking extensions 54D of cleats 25B, 25C, and 25D respectively also help prevent the above-mentioned side slippage.

While present exemplary embodiments of this invention, and methods of practicing the same, have been illustrated and described, it will be recognized that this invention may be otherwise variously embodied and practiced within the scope of the following claims.

What is claimed is:

1. An endless track adapted for movement in an endless path and comprising, a band-like body comprised of an elastomeric material, a plurality of substantially U-shaped cleats extending across said track with each cleat having a bight and a pair of outwardly extending legs, each cleat being partially embedded in said body and thus securely bonded thereto with the outer end portions of its legs exposed to provide optimum traction, each cleat having a volume defined by its bight and its outwardly extending legs substantially filled with elastomeric material to thereby assure said legs are prevented from collapsing toward said bight, and drive means comprising said body and enabling said track to be driven by an associated drive, said cleats providing both improved lateral stability and traction for said track.

2. A track as set forth in claim 1 in which each of said cleats comprises a metal cleat which is coated to provide an optimum bond between it and the elastomeric material comprising said body.

3. A track as set forth in claim 1 in which said elastomeric material comprises a polymer and said body comprises a strengthening cord extending in said endless path and a fabric layer arranged on each side of said strengthening cord.

4. A track as set forth in claim 1 in which said body has an inside surface provided with a plurality of equally spaced integral ribs made of said elastomeric material, said ribs being arranged substantially perpendicular to said endless path and increasing the lateral stability of said track yet assuring adequate flexibility during movement in said endless path.

5. A track as set forth in claim 1 in which said drive means comprises a plurality of lugs on said body and said drive comprises a drive wheel having driving members each adapted to engage associated lugs and drive said track.

6. A track as set forth in claim 1 in which said drive means comprises a plurality of openings provided in said body in equally spaced relation along the endless path with each opening exposing a portion of a cleat and said drive comprises a drive sprocket having drive teeth, each opening exposing a portion of a cleat to enable an associated tooth of said sprocket to engage said portion and drive the track.

7. A track as set forth in claim 1 in which each of said outwardly extending legs has a roughly L-shaped extension extending from the terminal end thereof with each extension having a leg portion pointing toward the bight of its associated cleat, said L-shaped extensions providing added strength for their associated cleats.

8. A track as set forth in claim 1 in which each of said outwardly extending legs has opposite end portions which are severed from their bight and formed inwardly in an arcuate path to define substantially semicylindrical end portions for each of said cleats which help prevent inward collapse of said outwardly extending legs, said semicylindrical end portions also preventing said track from slipping transverse said endless path.

9. A track as set forth in claim 1 in which each outwardly extending leg of each U-shaped cleat is comprised of a plurality of cooperating sections each having a hooking end which extends toward the center of its associated bight, each of said hooking ends providing added strength and rigidity for its associated leg section while preventing side slippage of said track.

10. A track as set forth in claim 1 in which each U-shaped cleat has a volume defined by its bight and outwardly extending legs substantially filled with elastomeric material and further comprising strengthening means provided between the outwardly extending legs of each cleat while being embedded in the elastomeric material in said volume.

11. A track as set forth in claim 1 and further comprising strengthening means provided between the outwardly extending legs of each cleat to prevent flattening of said legs.

12. A track as set forth in claim 11 in which said strengthening means comprises a plurality of spacer members fixed between the outwardly extending legs of each cleat.

13. A track as set forth in claim 11 in which said strengthening means comprises a plurality of substantially V-shaped projections formed in said legs with the apex of each projection arranged toward the center of its associated cleat.

14. An endless track having a substantially uniform width and being adapted to be moved in an endless path, said track comprising, a band-like body comprised of an elastomeric material, a plurality of substantially U-shaped cleats extending across practically the full width of said track with each cleat having a bight and a pair of outwardly extending legs, each cleat being partially embedded in said body and thus securely bonded thereto with the outer end portions of its legs exposed to provide optimum traction, each cleat having a volume defined by its bight and its outwardly extending legs substantially filled with elastomeric material, and drive means comprising said body and enabling said track to be driven by an associated drive, said cleats providing both improved lateral stability and traction for said track.

15. A track as set forth in claim 14 in which each of said cleats comprises a metal cleat which is made from a single flat strip of metal.

16. A track as set forth in claim 14 and further comprising strengthening means provided as an integral part of and extending between the outwardly extending legs of each cleat in an embedded manner within the elastomeric material in said volume, said strengthening means and elastomeric material in said volume providing optimum strength for the associated cleat.

17. A track as set forth in claim 16 in which each of said outwardly extending legs of each cleat has opposite end portions which are severed from their bight and formed inwardly in an arcuate path to define substantially semicylindrical end portions for each of said cleats.

18. A track as set forth in claim 17 in which each of said cleats is made from a single flat strip of metal and further comprising a plurality of openings through the bight of each cleat allowing elastomeric material to extend therethrough and help hold each cleat firmly in position.

* * * * *